Oct. 27, 1953     J. B. CATALDO ET AL     2,656,592
METHOD OF MANUFACTURING SNAP DISK SPRINGS
Filed Jan. 18, 1950

INVENTORS
ELBERT DeF. TIDD
BY JOHN B. CATALDO
Campbell, Brumbaugh, Free & Graves
ATTORNEYS Patented Oct. 27, 1953

2,656,592

UNITED STATES PATENT OFFICE 2,656,592

METHOD OF MANUFACTURING SNAP DISK SPRINGS

John B. Cataldo, Bernardsville, and Elbert De F. Tidd, Clinton, N. J., assignors to John B. Pierce Foundation, New York, N. Y., a corporation of New York Application January 18, 1950, Serial No. 139,182

3 Claims. (Cl. 29—148)

This invention relates to methods for manufacturing snap springs having various calibration characteristics.

In general snap springs having one or two positions of equilibrium may be formed from suitable mono- or bimetallic blanks by any one of several known methods, and are adaptable in their operating characteristics to meet a wide variety of uses. Snap springs may be formed, for example, having such characteristics as two points of equilibrium requiring equal forces for initiating snapping, two points of equilibrium requiring unequal snapping forces, one point of equilibrium requiring a relatively large force for snapping out of equilibrium and a light force for maintaining the unstable position, etc.

Bimetallic snap springs are usually thermal-responsive, with heat causing dissimilar expansion of the dissimilar metals of which the springs are formed to develop the forces necessary to cause instantaneous snapping or buckling of the spring at a given temperature. Such units, in the self-returning form, are used, for example, as the fundamental component in thermostats, and in the non-self-returning form in circuit breakers. Monometallic springs, on the other hand, are used to stabilize and otherwise improve the operation of relays, manually actuated switches and the like, and depend exclusively upon externally applied forces for their actuation.

It has been found in the production of snap springs of the above types by prior art methods that it is difficult to meet consistently preestablished temperature or force calibration values; and that among any given batch of springs produced by the same method, the calibration of a certain percentage of the units may exceed reasonable tolerances. Moreover, present techniques for imparting snapping characteristics to the springs may so stress or distort certain portions of the material of which the springs are formed that the useful work lives are shortened, as by premature fatiguing.

It is an object of this invention, therefore, to provide a novel method for fabricating snap springs of various types and having various operating characteristics whereby close calibration tolerances may be consistently achieved under either high or low rates of production.

A further object of the invention is to provide snap springs so shaped and stressed that the cycling or snapping life is extended, with the calibration characteristics maintaining good stability throughout.

According to this invention, various calibration characteristics may be imparted to snap springs by subjecting suitable blanks to one or more die operations using curved surface dies whereby a comparatively large portion of the material of which the spring is formed is uniformly compressed and shaped, thereby to distribute permanent stresses uniformly throughout at least one surface of the spring material. In certain cases, the spring may be so worked by a sequence of die operations that normally incompatible compression and tension stresses may exist in preestablished proportions in each surface of the spring without mutual nullification. Heat treatment may be used in conjunction with the die operations to modify or intensify stresses as may be required to meet close tolerances or otherwise treat the spring material to stabilize calibration and improve wear characteristics.

The calibration characteristics imparted to springs formed according to this invention are functions of a relatively large number of variables, including ultimate configuration, forming pressures as applied by the dies, materials used, heat treatment, etc., all as set forth in the following specification referring to the accompanying drawings in which.

Snap springs are formed according to the invention from blanks made of such materials as beryllium copper alloys, spring steels or other suitable hard, resilient materials.

Figure 1:
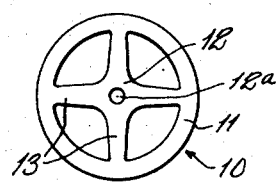
Figure 1 is a plan view of a typical snap spring.
Figure 2:
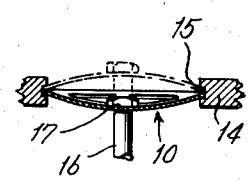
Figure 2 is a side view in cross-section of a monometallic snap spring disposed in one position of equilibrium and a preferred mounting and actuating assembly.

A representative finished snap spring of perforate, disc form is designated by numeral 10 in Figures 1 and 2 of the drawing. The disc 10 is monometallic, i. e., is comprised of a single material, and includes a rim portion 11 and a hub portion 12 joined by four radial legs 13. The hub is formed with an aperture 12a which may be used both in the ultimate mounting assembly for the disc, as shown in Figure 2, and in the forming process as described below.

The geometrical characteristics of the blank, such as peripheral contouring, number and length of legs, width of rim and hub portions, radius of curvature, as well as the materials of which the disc is formed, may all be varied as functions of the ultimate calibration characteristics imparted thereto. Broadly, this invention is not concerned with these variables for the reason that the method and product comprising the invention may be practiced or attained using blanks of a wide variety of shapes and materials. It is sufficient for purposes of this disclosure to note that rim width, leg width and material thickness are directly proportional to spring strength or snapping force, all other factors being equal, while leg length and radius of curvature are inversely proportional to the snapping force.

One preferred mounting for the disc comprises a stationary annular wall portion 14 having a groove 15 for receiving the periphery of the disc. In this fashion the center portion of the disc may be forced from its position of stable equilibrium, as shown in full lines in Figure 2, to an unstable position, or a second position of equilibrium, as shown in broken lines, by applying the requisite snapping force at its center. Once initiated, the movement of the disc between these positions is extremely rapid and forceful and may be utilized, for example, to control the opening and closing of electrical contacts as in a relay or snap switch (not shown). A throw-arm 16 is secured to the center portion of the disc 10 by a bolt and nut assembly 17 through the central aperture 12a. Preferably, the disc is permitted limited free movement between the disc-engaging face of the nut and opposing shoulder of the throw arm in order that the center portion of the disc may be free of clamping forces which could adversely affect its established calibration. Alternatively, snap springs may be mounted by anchoring their center portions to a suitable mounting post and permitting the rim portions to partake of the snap movement.

Figure 3:
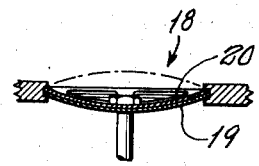
Figure 3 is a side view in cross-section of a bimetallic snap spring and a preferred mounting assembly.

Shown in Figure 3 is a bimetallic disc 18, which is comprised of two laminated discs 19 and 20 of materials having dissimilar coefficients of expansion, such as beryllium copper and spring steel, for example, bonded together as by welding or riveting. The action of the bimetallic disc is such that upon heating by passing an electric current directly through the disc or by exposure to heat from an external source, the disc snaps to a second position, hereinafter called the "hot" position. The inherent properties imparted to bimetallic discs may be such that they will return to "cold" position automatically within a given temperature range, or such that they will remain in "hot" position until manually returned. It will be understood that the action of bimetallic snap springs is distinguishable from that of conventional bimetallic strips in that the latter move from one position to another at a relatively slow rate which is a function of the rate of change of temperature, whereas the snap types tend to maintain one position until a given temperature is attained, at which time the excursion or snap will occur instantaneously.

Figure 4:
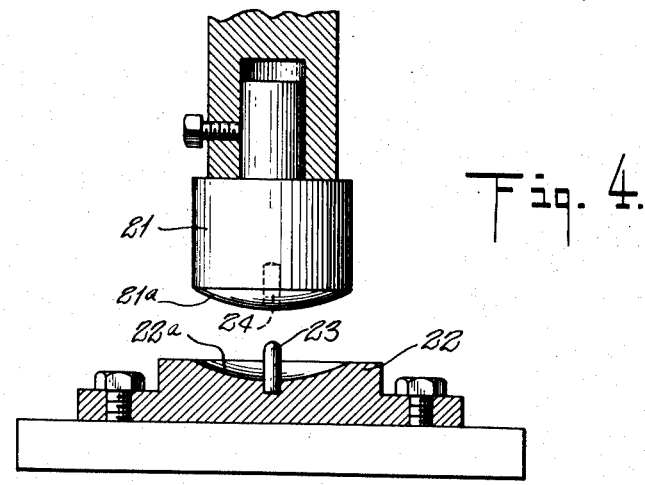
Figure 4 is a side view partially in cross-section of a typical die and press assembly which may be used in the fabrication of snap springs according to the invention disclosed herein.

A preferred method according to the invention for forming either mono- or bimetallic discs involves the use of dies mounted in a suitable press, the operative elements of which are shown in Figure 4, and include a movable male die 21 having a spherical convex working surface 21a, and a stationary female die 22 having a spherical concave working surface 22a. An aligning pin 23 may be secured in the center of the female die to extend upwardly in the direction of movement of the male die, which is provided with a pin-receiving bore 24. The press is preferably of the hydraulic type furnished with suitable control means for governing the die pressures within close limits.

A disc blank is placed in the press with the central aperture 12a fitted over the guide pin 23. The dies are then brought together to compress the disc into a permanent dished configuration in a cold-forging action which imparts permanent compressive stresses to the concave surface thereof and tensile stresses to the convex surface thereof.

The diameter of the spherical die faces is preferably such that the entire disc is embraced so that substantially uniform pressures are applied throughout its area.

The disc, when removed from the dies will, with adequate forming pressure, have a position of equilibrium in the dished configuration from which it emerges from the dies. The force required to displace the disc from this position will be a function of the radius of curvature of the dies and the pressure utilized in the die operation.

The stresses locked in the disc may be modified subsequent to the first forming operation by heat treatment, to be described later, or by a second die operation. In the latter case the disc is inverted and placed between the same or other dies, with its convex surface opposing the male or convex die, and the dies brought together to compress the disc into a dished configuration in the opposite direction.

As a result of this operation each surface or skin of the disc will have imparted thereto permanent compressive and tensile stresses which may exist therein without complete mutual cancellation or nullification. Thus to obtain a balanced double-equilibrium disc, the disc is subjected to compression on both sides in the same or equivalent dies with dissimilar forming pressures being applied in the respective die operations. Dissimilar forming pressures are required because of partial cancellation of forces locked in the disc by the first blow in the dies. Thus in order to balance the stresses on either surface of the disc, the forming pressure in the second operation must be reduced as a function of the cancellation by the second operation of stresses imparted by the first operation.

It follows that to obtain an unbalanced double-equilibrium characteristic the disc may be subjected to compression on both sides in the same or equivalent dies, but with the same pressures used in each die operation so that unbalance is effected by virtue of nullification of certain of the stresses imparted in the first operation. Likewise the unbalanced double-equilibrium characteristic may be imparted to a disc by subjecting it to only one die operation, i. e. compression on one side only, but at a relatively high pressure. A single-equilibrium characteristic may be obtained in a disc by subjecting it to compression on one side only and using relatively low forming pressure.

By virtue of the permanent stresses in each surface of the disc two positions of stable equilibrium may obtain therein, i. e. the disc may be forced into either of its dished configurations and will there remain until forced to the opposite position. The force required to displace the disc between its positions of equilibrium will now be a function of the ratio of the compressing forces used in each of the two die operations and of the ratio of the respective radii of curvature of the dies used. Thus it is possible to utilize dies for the second operation having curvatures differing from those of the dies used in the first operation, to vary the ultimate snapping characteristics imparted to any given disc, with the snapping forces attained being inversely proportional to the radii of curvature of the die surfaces.

It will be understood that the effects of the die operations are substantially the same whether the blank used is monometallic or bimetallic and that the above methods may in general be applied to either type of snap spring.

Heat treatment of any known kind such as oven heating, induction heating, etc. may be used to supplement the single or multiple die operations described above in order to modify the stresses and hence the calibration characteristics imparted to any given disc. In general heat treatment is used to achieve closer control of the final calibration, but in addition may be used to achieve higher calibration forces in certain springs, to anneal the spring material to remove forging stresses and maintain calibration through the spring life, and to increase the fatigue point of the material. The effects of heating on monometallic and bimetallic snap springs, however, are inherently different and will be separately considered.

During heat treatment of monometallic springs stressed according to the above methods one of the positive forces, i. e. that force which tends to resist movement of a spring out of a given state of equilibrium becomes negative, i. e. that force which tends to move a spring into another position of equilibrium. Thus a spring having double-equilibrium characteristics may eventually become a single equilibrium type. The transition from positive to negative is slow, being a function of the temperature and/or heating time, and it is possible, therefore, to obtain calibration characteristics at any intermediate point by controlled heat treatment.

If a double-equilibrium spring is subjected to heat treatment it tends to be converted into a spring having a single point of equilibrium. In such case the single point of equilibrium remaining will be that in which the spring is disposed during heat treatment. In other words, if a double-equilibrium spring is disposed in a given configuration representing one point of equilibrium and is subjected to a maximum heat treatment it will lose its second point of equilibrium so that although it may be snapped to a second position as before, it will be unstable in the second position, and in the absence of continuing force will return to the initial point of equilibrium.

Bimetallic springs on the other hand will, under the influence of heat, eventually snap to the hot position. Thus it is immaterial in which position bimetallic springs are initially disposed when heat treated, and in this respect they differ from monometallic springs.

Heat treatment of bimetallic springs acts to modify the permanent stresses in such a manner that the temperature differential between the hot and cold calibrations increases. Thus if a desired differential is not attained in the die operations it may be attained either by further die operations or by subsequent heat treatment until the desired differential is attained.

While the invention has been described herein by reference to certain preferred embodiments thereof, it will be understood that certain obvious modifications in the procedure may be made without departure from the spirit of the invention, which should accordingly be determined in scope of the following claims.

We claim:

1. A method of producing a snap disc spring comprising slowly compressing a flat, stress-free, disc blank of resilient sheet material between uniformly curved male and female die components adapted to work the full surfaces of the disc and having rounded working surfaces to impart a dished shape to the disc whereby the convex surface of the disc has permanent tensile stresses imparted thereto and the concave surface has permanent compressive stresses imparted thereto, and, with the once-worked disc turned over with respect to the male and female working surfaces of the dies to present the convex surface of the disc to a male die, slowly compressing said once-worked disc between uniformly curved male and female dies adapted to work the full surfaces of the disc and having rounded working surfaces whereby the disc is dished in the opposite direction to impart tensile stresses to the surface initially having compressive stresses therein and nullifying a portion of said compressive stresses and to impart compressive stresses to that surface originally having tensile stresses and nullifying a portion of the latter, thereby to yield a snap disc spring each surface of which has both compressive and tensile stresses imparted permanently therein, said stresses being a function of the radii of curvature of the respective dies and the pressures used in the die operations.

2. The method of forming a thermal responsive snap spring comprising laminating two inherently resilient metallic sheet members having different coefficients of expansion to form a bimetallic bank, slowly compressing in a first die operation the full surfaces of the blank between a pair of mating dies having uniformly curved working surfaces to work the entire blank and to form the blank into a substantially dished configuration, and, with the disc turned over with respect to the dies to present the convex surface of the disc to a convex die surface, subjecting said blank to a second die operation whereby the full surface of the blank is slowly forced into a dished configuration in the opposite direction.

3. The method as defined in claim 2 wherein the radii of curvature of the dies in the first and second operations are different.

JOHN B. CATALDO.
ELBERT DE F. TIDD.

References Cited in the file of this patent

UNITED STATES PATENTS

| Number | Name | Date |
|--------|------|------|
| 1,593,511 | Spencer | July 20, 1926 |
| 1,654,320 | Colby | Dec. 27, 1927 |
| 1,852,543 | Spencer | Apr. 5, 1932 |
| 2,259,312 | Lee | Oct. 14, 1941 |
| 2,317,830 | Vaughan | Apr. 27, 1943 |
| 2,335,888 | Stillwell | Dec. 7, 1943 |
| 2,392,943 | Persons | Jan. 15, 1946 |

FOREIGN PATENTS

| Number | Country | Date |
|--------|---------|------|
| 582,185 | Great Britain | Nov. 7, 1946 |